United States Patent [19]

George

[11] Patent Number: 4,861,675

[45] Date of Patent: Aug. 29, 1989

[54] COATING PROCESS

[75] Inventor: Eric R. George, Houston, Tex.

[73] Assignee: Shell Oil Company, Houston, Tex.

[21] Appl. No.: 185,577

[22] Filed: Apr. 25, 1988

[51] Int. Cl.$^4$ .......................... B32B 27/42; B05D 1/08
[52] U.S. Cl. .................................... 428/501; 427/423; 428/524
[58] Field of Search .................. 525/185; 427/34, 223, 427/423; 239/85; 428/501, 524

[56] References Cited

U.S. PATENT DOCUMENTS

| | | | |
|---|---|---|---|
| 2,495,286 | 1/1950 | Brubaker | 260/63 |
| 3,440,079 | 4/1969 | Jensen | 117/22 |
| 3,694,412 | 9/1972 | Nozaki | 260/63 |
| 3,723,165 | 3/1973 | Longo et al. | 117/93.1 |
| 3,962,486 | 6/1976 | Gerek et al. | 427/34 |
| 4,592,964 | 6/1983 | Buran . | |
| 4,600,614 | 7/1986 | Lancaster | 428/35 |
| 4,604,306 | 8/1986 | Browning | 427/423 |
| 4,632,309 | 12/1986 | Reimer | 239/8 |

FOREIGN PATENT DOCUMENTS

| | | |
|---|---|---|
| 121965 | 10/1984 | European Pat. Off. . |
| 181014 | 5/1987 | European Pat. Off. . |
| 3513207 | 10/1986 | Fed. Rep. of Germany . |
| 1081304 | 8/1967 | United Kingdom . |

*Primary Examiner*—Janyce Bell
*Attorney, Agent, or Firm*—Dean F. Vance

[57] ABSTRACT

A coated object is produced by flame spraying the object with a substantially molten polymeric material which comprises a linear alternating polymer of ethylene and at least one ethylenically unsaturated hydrocarbon optionally blended with a copolymer of ethylene and $\alpha,\beta$-ethylenically unsaturated carboxylic acid.

13 Claims, No Drawings

COATING PROCESS

FIELD OF THE INVENTION

This invention relates to a process for coating an object with a linear alternating polymer of carbon monoxide and at least one ethylenically unsaturated hydrocarbon. More particularly, the invention relates to a flame spraying process for coating a solid object with a polymeric material comprising the linear alternating polymer or a blend thereof with a copolymer of ethylene and an unsaturated carboxylic acid.

BACKGROUND OF THE INVENTION

The class of polymers of carbon monoxide and olefin(s) is well known in the art. Early methods for the production of various types of such polymers are illustrated by Brubaker, U.S. Pat. No. 2,495,286, U.K. Pat. No. 1,081,304 and Nozaki, U.S. Pat. No. 3,694,412. More recently, the class of linear alternating polymers of carbon monoxide and at least one ethylenically unsaturated hydrocarbon, e.g., ethylene or ethylene and propylene, has become of greater interest in part because of the greater availability of the polymers. These polymers, often referred to as polyketones or polyketone polymers, have been shown to be of a structure of the repeating formula —CO—(A)—wherein A is the moiety of ethylenically unsaturated hydrocarbon polymerized through the ethylenic unsaturation. For example, when the unsaturated hydrocarbon is ethylene, the polymer is represented by the repeating firmula —CO(CH$_2$—CH$_2$)—. The general process for the production of such polymers is illustrated by a number of published European patent applications including Nos. 0.121,965 and 0.181,014. The process generally involves the use of a catalyst formed from a compound of palladium, nickel or cobalt, the anion of a non-hydrohalogenic strong acid and a bidentate ligand of phosphorus, arsenic or antimony.

The polyketone polymers are relatively high molecular weight thermoplastics of known utility in the production by conventional techniques of shaped articles for use in the food and drink industry and for automotive parts.

It is, on occasion, useful to blend the polyketone polymers with other polymeric materials to retain the more desirable properties of the polyketone while improving other properties. For example, polyketone polymer is blended with a copolymer of ethylene and an unsaturated carboxylic acid, e.g., a copolymer of ethylene and acrylic acid, to produce blends having improved melt stability. Such blends are disclosed and claimed in copending U.S. patent application Ser. No. 135,429, filed Dec. 21, 1987, now abandoned (Docket No. T-4235).

The polyketones or the blends with copolymer of ethylene and unsaturated carboxylic acid, are shaped and/or formed by a variety of conventional techniques such as extrusion or injection molding into objects of known utility. For other purposes, it would be of advantage to coat objects with a coating of the polyketone polymer or blend thereof with ethylene/unsaturated carboxylic acid copolymer.

SUMMARY OF THE INVENTION

The present invention relates to a process for coating objects with a linear alternating polymer of carbon monoxide and at least one ethylenically unsaturated hydrocarbon and to the coated objects thereby produced. More particularly, the present invention relates to a process for flame spray coating an object with the linear alternating polymer or blend thereof with an ethylene/unsaturated acid copolymer to coat the object. The invention also relates to the coating objects thereby produced.

DESCRIPTION OF THE INVENTION

The polymeric material employed to flame spray coat objects according to the process of the invention is a polyketone polymer optionally blended with a copolymer of ethylene and certain $\alpha,\beta$-ethylenically unsaturated carboxylic acids.

The polyketone polymer which is employed in the process of the invention is a linear alternating polymer of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other $\alpha$-olefins including propylene, butylene, isobutylene, 1-hexene, 1-octene and 1-dodecene, or are arylaliphatic containing an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, m-methylstyrene, p-ethylstyrene and p-methylstyrene. Preferred polyketones are copolymers of carbon monoxide and ethylene or terpolymers of carbon monoxide, ethylene and a second hydrocarbon of at least 3 carbon atoms, particularly an $\alpha$-olefin such as propylene.

The structure of the polyketone polymers is that of a linear alternating polymer of carbon monoxide and ethylenically unsaturated hydrocarbon and contains substantially one molecule of carbon monoxide for each molecule of hydrocarbon. When terpolymers of carbon monoxide, ethylene and a asecond hydrocarbon are employed, there will be within the terpolymer at least two units incorporating a moiety of ethylene for each unit employing a moiety of the second hydrocarbon. Preferably there will be from about 10 units to about 100 units incorporating a moiety of ethylene per unit employing a molecule of the second hydrocarbon. The polymer chain is therefore illustrated by the formula

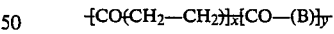

wherein B is the moiety of the second hydrocarbon polymerized through the ethylenic unsaturation. The —CO—(CH$_2$—CH$_2$)—units and the —CO(B)—units are found randomly throughout the polymer chain and the ratio of y:x is no more than about 0.5. In the modification of the invention where copolymer of ethylene and carbon monoxide is employed, the polymer is illustrated by the above formula wherein y=0. When y is other than 0, as in the case of terpolymers, ratios of y:x from about 0.1 to about 0.01 are preferred. The end groups or "caps" of the polymer chain will depend on what materials are present during the production of the polymer and whether and how the polymer is purified. The precise nature of the end groups is of little significance so far as the overall properties of the polymer are concerned so that the polyketone polymer is fairly represented by the above formula. Of particular interest are the polymers of molecular weight from abut 1,000 to about 200,000, particularly those polyketone polymers of molecular weight from about 10,000 to about 50,000. The physical properties of the polymers will depend in part on whether the polymer is a copolymer on a terpolymer and the relative proportion of second hydrocarbon present in the case of terpolymers. Typical melting points of such polymers are from about 175° C. to about 300° C., but more typically from about 210° C. to about 270° C. The polymers have limiting viscosity numbers (measured at 60° C. in m-cresol) of from about 0.5 to about 10, more commonly from about 0.8 to about 4, as measured in a standard capillary viscosity measuring device.

A method of producing the polymers which is now becoming conventional is to contact the carbon monoxide and hydrocarbon(s) in the presence of a catalyst composition formed from a palladium compound, the anion of a non-hydrohalogenic acid having a pKa below about 6 and a bidentate phosphorus ligand of defined structure. The scope of the process of producing the polyketone polymer is extensive, but without wishing to be limited, the preferred palladium compound is a palladium carboxylate, particularly palladium acetate, the preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane. Such a process for polyketone production is illustrated by copending U.S. patent application Ser. No. 930,468, filed Nov. 14, 1986 (Docket No. K-0722).

Polymerization is conducted under polymerization conditions in the gas phase or in a liquid phase in the presence of a liquid diluent, e.g., an alkanol such as methanol or ethanol. The reactants and catalyst composition are contacted by conventional means such as shaking or stirring. Suitable reaction temperatures are from about 20° C. to about 150° C. with preferred reaction temperatures being from about 50° C. to about 135° C. Typical reaction pressures are from about 1 bar to about 200 bar, more typically from about 10 bar to about 100 bar. Subsequent to reaction the polymer product is recovered as by filtration or decantation. The polyketone polymer may contain residues of the catalyst which are removed, if desired, by treatment of the polymer with a solvent or a complexing agent which is selective for the residues.

The flame spray process of the invention is usefully conducted employing the polyketone polymer without the addition of other materials. However, conventional additives such as antioxidants and stabilizers which are designed to improve the properties of the coated object may be incorporated within the polyketione polymer. In a particular embodiment, however, the polyketone is blended with a second polymeric component and the resulting blend is employed in the flame coating process. A second polymeric material preferred as a co-component of a polymer blend when a blend is employed in the process of the invention is a copolymer of ethylene and α,β-ethylenically unsaturated carboxylic acid. Although a variety of such unsaturated carboxylic acids of up to 10 carbon atoms inclusive, or in some cases even more, is useful as a monomer in the ethylene copolymers, e.g., 2-hexenoic acid, 2A-octenoic acid and 2-decenoic acid, the preferred ethylenically unsaturated acids are those of up to 4 carbon atoms inclusive which are acrylic acid, methacrylic acid and crotonic acid. Methacrylic acid and acrylic acid are particularly preferred components of the ethylene/unsaturated carboxylic acid copolymer.

The ethylene/unsaturated carboxylic acid copolymers are those copolymers having a relatively large proportion of ethylene and a relatively small proportion of the unsaturated carboxylic acid. Suitable ethylene copolymers have from about 0.1% by weight to about 35% by weight of unsaturated carboxylic acid, based on the total copolymer. Preferably, the copolymers have from about 1% by weight to about 20% by weight of the unsaturated carboxylic acid on the same basis.

The method by which the copolymers are prepared is not critical and ethylene/unsaturated acid copolymers produced by a variety of methods are usefully employed when polyketone blends are used in the flame spraying process. A number of ethylene/acrylic acid and ethylene/methacrylic acid copolymers are commercially available. A particularly useful class of ethylene/acrylic acid copolymers is marketed by Dow Chemical Company under the tradename PRIMACOR®. A general discussion of the production of ethylene/unsaturated carboxylic acid copolymers is found in Thompson et al, U.S. Pat. No. 3,520,861 and Armitage, U.S. Pat. No. 4,351,931, the disclosures of which are incorporated herein by reference.

As stated, the process of the invention is usefully conducted with the polyketone polymer without the presence of an ethylene/unsaturated acid blended therewith. The preferred method of operating the process of the invention is an alternate embodiment, however, wherein the polymeric material employed as feed for the flame spraying process is a blend of the polyketone and the ethylene/unsaturated carboxylic acid copolymer. When such a blend is employed, blends containing up to about 80% by weight, based on total blend, of the ethylene/unsaturated carboxylic acid copolymer may be used, however, blends of up to about 35% by weight are satisfactory. Blends containing from about 0.1% by weight to about 10% by weight of ethylene/unsaturated carboxylic acid copolymer, based on total blend, are preferred and particularly preferred, when bends are to be employed, are polyketone blends containing from about 3% by weight to about 7% by weight, on the same basis, of the ethylene/unsaturated carboxylic acid copolymer.

The method of forming a blend to be used in the process of the invention, when blends are employed, is not material so long as a uniform blend of the components is produced without undue degradation of the components or the resulting blend. In one modification the polyketone polymer and the ethylene/unsaturated carboxylic acid copolymer are coextruded to produce the blend as an extrudate. In an alternate modification, the components are dry blended as powders or blended in a mixing device which exhibits high shear. The polyketone blend with ethylene/unsaturated carboxylic acid copolymer is a non-miscible blend wherein the ethylene/unsaturated acid copolymer exists as a discrete phase in the polyketone matrix. Satisfactory phase size for use in the invention on the order of from about 0.2 micron to about 1.5 micron, preferably from about 0.5 micron to about 1.0 micron. The blend is, of course, not homogeneous but good results are obtained in the process of the invention when the blend is a uniform mixture of the dispersed ethylene/unsaturated carboxylic acid copolymer in the continuous polyketone phase.

The blends used in the process of the invention may optionally contain other conventional additives such as antioxidants, stabilizers and fire retardant materials and other additives designed to improve the processability of the polymers or improve the properties of the resulting blend. Such additives are added by conventional methods prior to, together with or subsequent to the blending of the component polymers.

The general methods of flame spraying polymeric or other finely divided materials are known in the art. The basic concept of flame spraying of thermoplastic polymeric materials involves an apparatus wherein the polymeric material, a fuel and oxygen-containing gas are introduced into a combustion chamber wherein the fuel and oxygen-containing gas mixture ignites, thereby giving off heat which serves to substantially melt the polymeric material. The molten polymeric material is thereafter propelled from the combustion chamber by a source of propelling gas onto the surface of the object to be coated. An alternate modification of the process, also often termed flame spraying, although not directly involving a flame, employs the use of a heated wire or filament to melt the polymer to be sprayed. The use of a flame produced by combustion of a fuel in air is generally preferred.

Illustrative fuels are generally low-molecular weight hydrocarbons which ignite easily and are normally gaseous at ambient conditions. Examples of suitable fuels include propane, propylene, ethylene and acetylene. As the oxygen-containing gas employed to cause combustion of the fuel, a variety of mixtures of oxygen and other non-combustible gases are usefully employed. Air is preferred. A variety of gaseous materials is useful as the propelling gas including nitrogen, argon and helium. Largely for convenience and economy, the use of air as the propelling gas as well as the combustion gas is preferred. Examples of such flame spraying processes and apparatus therefor are known in the art. A particularly useful process and equipment for use in the process is described in Reimer, U.S. Pat. No. 4,632,309. Other related processes are illustrated by U.S. Pat. Nos. 4,604,306, 3,723,165 and 3,440,079.

In a representative embodiment of the process of the invention the polymeric material comprising the polyketone polymer optionally blended with ethylene/unsaturated carboxylic acid, provided in a finely divided powder form, is mixed with propane fuel and air and passed to a combustion chamber where the fuel and air are ignited, thereby providing the energy required to substantially melt the polymeric material. The molten polymeric material is propelled from the combustion chamber and from the apparatus through the use of compressed air as a propelling carrier gas and is allowed to impact upon an object, the coating of which is desired. The target object, being relatively cool, will cause the molten polymer to solidify and thereby provide the coating.

The state of division of the polymeric material powder as well as the viscosity of the polyketone polymer, is important in obtaining good coatings on the target object. The polymeric material to be flame sprayed should be of a size from about 20 mesh to about 100 mesh, preferably from about 50 mesh to about 80 mesh. The limiting viscosity number of the polyketone polymer (LVN, measured at 60° C. in m-cresol) should be from about 0.5 to about 1.8 and preferably is below 1.4.

The object to be coated is a solid object for which a tough, wear and corrosion resistant coating is desired and objects of metal, glass, ceramic, plastic or other material are coated by the present process. More frequently, the process is employed to provide a coating of polyketone or blend thereof on metal objects. The process of the invention may be used in conjunction with other polymeric coatings wherein the object to be coated has a base coat of a first polymeric composition, such as a polyolefin, and a subsequent top coat of polyketone ior polyketone blend. Alternatively, the coating comprising polyketone may be used to provide a base coat suitable for subsequent top coating with a second composition. The process is particularly suitable for coating both internal and external automotive parts such as drive shafts and suspension springs and for coating storage tanks, food processing equipment and industrial pipe.

The invention is further illustrated by the following Illustrative Embodiments which should not be construed as limiting.

ILLUSTRATIVE EMBODIMENT I

A linear alternating copolymer of carbon monoxide and ethylene was produced by contacting the carbon monoxide and ethylene in the presence of a catalyst composition formed from palladium acetate, the anion of trifluoroacetic acid and 1,3-bis[di(2-methoxyphenyl)-phosphino]propane. The copolymer had a melting point of 250° C. and a LVN (measured at 60° C. in m-cresol) of 1.3.

Three linear alternating terpolymers of carbon monoxide, ethylene and propylene were separately produced in the presence of catalyst compositions formed from palladium accetate, the anion of trifluoroacetic acid and 1,3-bis(di(2-methoxyphenyl)phosphino)propane. The terpolymers each had a melting point of about 220° C. and LVN (measured at 60° C. in m-cresol) of 1.2, 1.6 and 2.2, respectively

ILLUSTRATIVE EMBODIMENT II

The terpolymers of Illustrative Embodiment I were separately employed in a flame spraying process to coat metal plates of aluminum and steel approximately 3 in. by 7 in. with a thickness of 1/16 in. The terpolymers were used as powders of roughly 50 to 80 mesh and the powders were dried prior to use.

The metal plates were flame dried and then coated by flame spraying for approximately four minutes each until a film coating thickness of 30 mils was achieved on each plate. The bond of the polymer coating to the metal plates was tested in ASTM Crosshatch Adhesion Test #D3359-78. In this standardized test procedure, a six-blade cutting apparatus was first used to score and crosshatch the polymer coating down to the metal surface. A special ASTM adhesive tape was applied to the top surface of the coating and subsequently pulled from the surface at an acute angle to test the adhesion of the coating to the metal substrate. The adhesion of the coating is rated from 1 to 5 according to the number of crosshatch squares that are removed by the tape, 5 being the highest rating. The coatings prepared with the terpolymers of Illustrative Embodiment I were all rated 5.

ILLUSTRATIVE EMBODIMENT III

The copolymer of Illustrative Embodiment I was blended separately with 30% by weight, based on total blend, of Primacor 1430 ® and Primacor 5990 ® ethylene-acrylic acid copolymers. Primacor 1430 is a copolymer of ethylene and 9.5% by weight based on copolymer of acrylic acid. Primacor 5990 is a copolymer of ethylene and 20% by weight based on copolymer of acrylic acid. The blend of Primacor 5990 copolymer also contained carbon black as a colorizing agent.

The blends were employed in a flame spraying process as in Illustrative Embodiment II to coat aluminum and steel plates. The coatings were tested after they were prepared in ASTMA Crosshatch Adhesion Test #D3359-78, as in Illustrative Embodiment II. All of the coatings were rated 5.

ILLUSTRATIVE EMBODIMENT IV

The terpolymer of Illustrative Embodiment I having an LVN of 2.2 was blended separately with 20, 40, 60 and 80% by weight, based on total blend, iof Primacor 1430 ethylene-acrylic acid copolymer. The blend was employed in a flame spraying process to coat metal plates as in Illustrative Embodiment II and the coatings were tested in the ASTM Crosshatch Adhesion Test described before. The coatings were all rated 5.

The coated plates were tested for Gardner Impact strength with a 2 lb. weight and all of the coatings were rated at over 80 in.-lbs. In several cases, the metal plates cracked during testing, but not the polymeric coatings.

What is claimed is:

1. A process for coating a solid object with a polymeric material which process comprises flame spraying a polymeric material, provided as a powder having a particle size from about 20 mesh to about 100 mesh, the polymeric material comprising a linear alternating polymer of carbon monoxide and at least one ethylenically unsaturated hydrocarbon having up to 20 carbon atoms, which linear alternating polymer has a limiting viscosity number about 0.5 to about 10 as measured at 60° C. in m-cresol, uniformly mixed with from about 0.1% by weight with up to 80% by weight based on the total of a copolymer of ethylene and α,β-ethylenically unsaturated carboxylic acid of up to 10 carbon atoms inclusive, by heating the polymeric material powder to substantially melt the polymeric material and thereafter propelling the substantially molten polymeric material onto the surface of the solid object, thereby forming a coating.

2. The process of claim 1 wherein the linear alternating polymer is represented by the formula

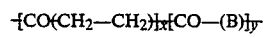

wherein B is the moiety of an ethylenically unsaturated hydrocarbon of at least 3 carbon atoms and the ratio of y:x is no more than about 0.5.

3. The process of claim 2 wherein the copolymer is a copolymer of ethylene and from about 0.1% by weight to about 35% by weight based on total copolymer of an α,β-ethylenically unsaturated carboxylic acid of up to 4 carbon atoms inclusive.

4. The process of claim 3 wherein the copolymer is a copolymer of ethylene and from about 1% by weight to about 20% by weight based on total copolymer of acrylic acid or methacrylic acid.

5. The process of claim 4 wherein y=0.

6. The process of claim 4 wherein B is a moiety of propylene and the ratio of y:x is from about 0.01 to about 0.1.

7. The process of claim 6 wherein the copolymer is a copolymer of ethylene and acrylic acid.

8. The process of claim 7 wherein the quantity of copolymer is from about 0.1 to about 10% by weight based on total blend.

9. The process of claim 7 wherein the quantity of copolymer is from about 3 to about 7% by weight based on total blend.

10. The process of claim 2 wherein y=0.

11. The process of claim 2 wherein B is a moiety of propylene and the ratio of y:x is from about 0.01 to about 0.1.

12. The process of claim 11 wherein the quantity of copolymer is from about 0.1 to about 10% by weight based on total blend.

13. A coated object prepared by the process of claim 1.

* * * * *